Jan. 29, 1963  C. F. ROBINSON  3,075,426
REFRACTOMETRY APPARATUS
Original Filed Dec. 1, 1955  2 Sheets—Sheet 1
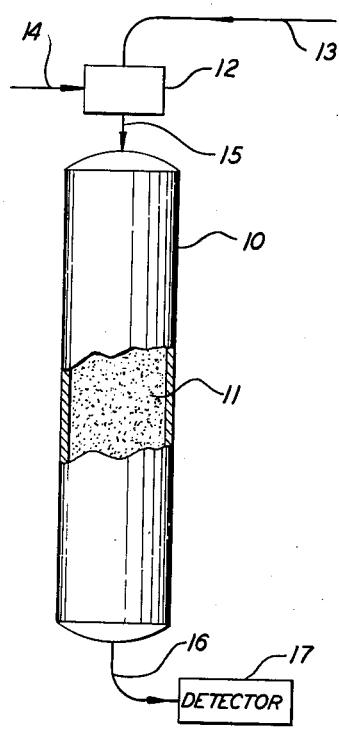
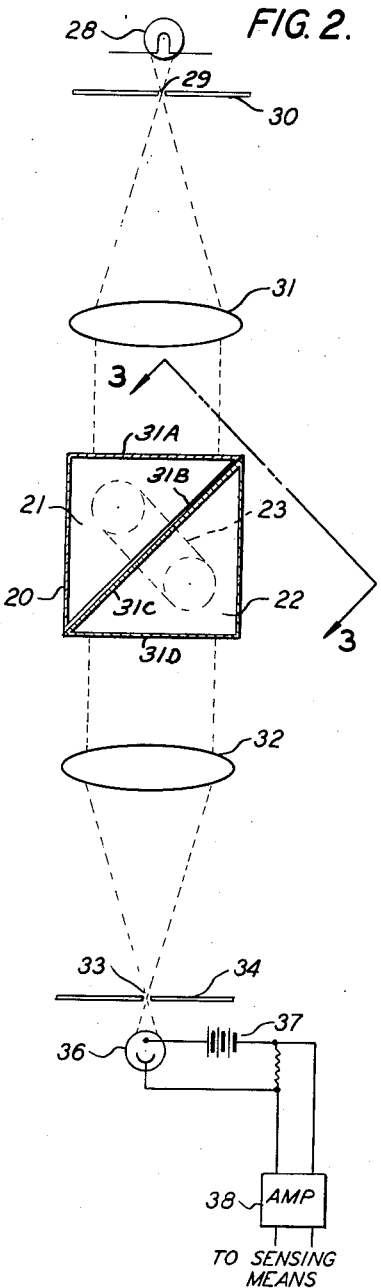
INVENTOR.
CHARLES F. ROBINSON
BY
Christie, Parker & Hale
ATTORNEYS

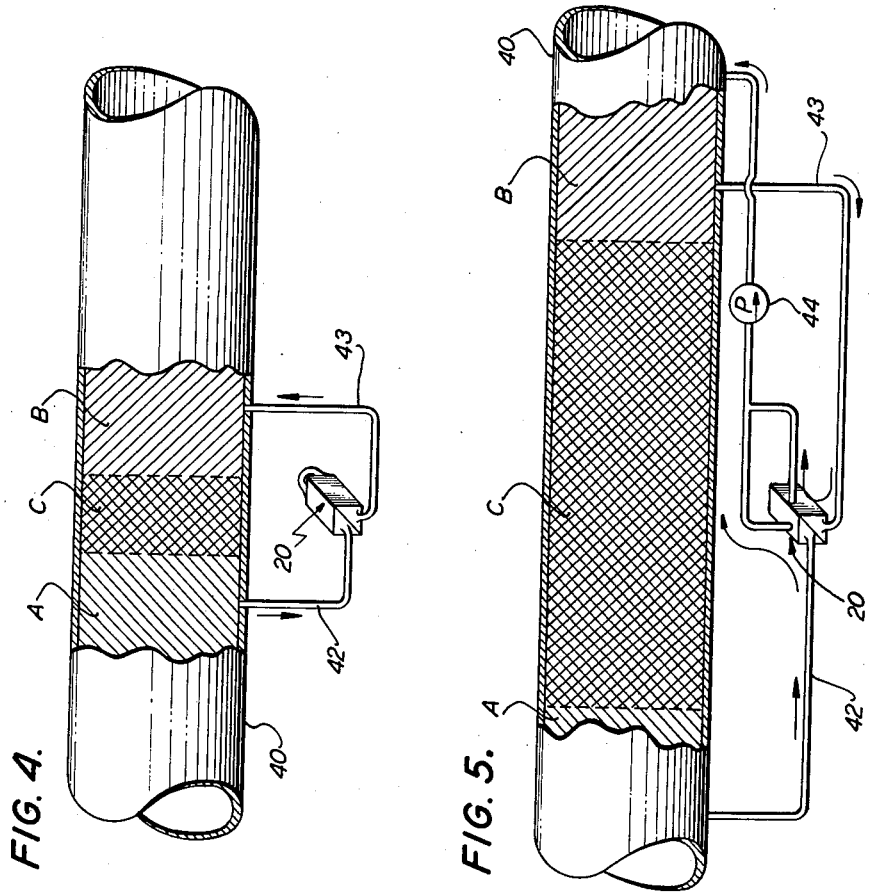
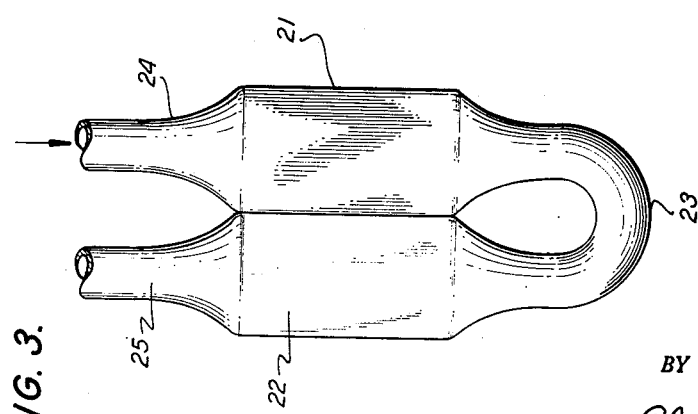

United States Patent Office 3,075,426
Patented Jan. 29, 1963

3,075,426
REFRACTOMETRY APPARATUS
Charles F. Robinson, Pasadena, Calif., assignor, by mesne assignments, to Consolidated Electrodynamics Corporation, Pasadena, Calif., a corporation of California
Continuation of application Ser. No. 550,300, Dec. 1, 1955. This application July 21, 1958, Ser. No. 750,037
3 Claims. (Cl. 88—14)

This is a continuation application of my copending application Serial No. 550,300, filed December 1, 1955 (now abandoned), and relates to apparatus for detecting changes in refractive index within a liquid stream.

Refractive index measurements are dependent on the phenomenon of a beam of light taking a new direction when it passes other than perpendicularly through an interface of two media, such as air and water, in which the velocity of light is different. Depending on the angle at which the light beam strikes the interface and its velocity in the two media, the beam is bent, refracted, or deviated from its original path. The "deviation" of a refracted light beam is defined as the angle between the final path of the refracted beam and the projected path which it would have followed had it not been refracted.

There are many instances, some of which will be considered in greater detail, in which it is desirable to detect or sense a change in a fluid which is accomplished by a change in refractive index and in which the refractive index itself is of little or no importance. One example of such a siutation is in pipe line transport of hydrocarbons or other liquids where it is frequently important to detect the interface between two liquid bodies of differeing composition. In such a situation the composition of the two liquid bodies is generally known; the refractive index is of no interest, but it is important to detect the passage of such an interface past a given point, which objective can be simply and quickly accomplished in accordance with the invention.

Another application in which it is desirable to detect an interface is in liquid-phase chromatography. It has been a common practice to detect the interface between two liquid components as they emerge from a chromatographic column by measurement of the refractive index of the effluent. Since one component will have a refractive index difference from that of the component preceding or following it, an intermittent refractive index sampling will detect the appearance of the separate components in the discharge from the column. The use of a conventional refractometer in this instance is extravagant because such a device collects much more information than is used and collects it in an unnatural form, that is, the refractometer produces integral rather than differential information. Furthermore, it is frequently difficult under these circumstances to provide differentiation because the time rate of change of refractive index in the output of a chromatographic column may be exceedingly low.

The invention contemplates apparatus for detecting a change in composition within a moving fluid stream, that is, for sensing an interface existing between two fluids of differing composition flowing consecutively in a stream, which comprises an optical cell, means for flowing at least a part of the fluid stream through the cell, and means operable to sense differences in refractive index of the fluid between at least two points within the cell.

One suitable form of cell for this purpose is composed of two prismatic sections with fluid-flow means connecting the two so that a fluid stream may be passed serially through the cell sections and a single light beam may be passed through both sections. The source for this light beam is part of a fixed-focus refractometer which, by virtue of the light passage serially through the two sections of the cell, is sensitive to a difference in the instantaneous refractive index of the fluid in each of the two cell sections. The absolute value of the refractive index is meaningless, the instrument being sensitive only to a disruption of the equality of the refractive indices between the two sections of the cell.

The invention contemplates detecting a change in refractive index of a fluid stream flowing sequentially through two optically aligned and transparent cell sections of a refractometer by flowing serially through the cell sections a first portion of the stream having one refractive index, and then flowing serially through the cell sections a second portion of the stream having a different refractive index to displace the first portion from first one of the cell sections and then the other. A light beam is passed through the two cell sections so the light beam is deviated from one path to another when the first portion of the stream is in one of the cell sections and the second portion is in the other cell, and the deviation of the beam is sensed to determine when the cell sections simultaneously contain fluids of different refractive indices.

Preferably the beam of light is passed through the cell sections so that it is substantially undeviated when the two cell sections contain fluid of the same refractive index, irespective of what the refractive index may be. With this arrangement, the method of operation is virtually independent of ambient temperature fluctuations and eliminates the need of temperature compensation.

The invention is applicable to both liquids and gases but is inherently most sensitive when employed to sense liquid changes.

The foregoing and other embodiments and uses of the invention will become apparent from the following detailed description taken in conjunction with the accompanying drawing, in which:

FIG. 1 is a schematic diagram of a chromatographic column and associated equipment to illustrate one use to which the invention may be put;

FIG. 2 is an optical diagram showing one form of optical cell in accordance with the invention as a part of a fixed-focus refractometer;

FIG. 3 is an elevation of the optical cell of FIG. 2 taken on line 3—3 of FIG. 2;

FIG. 4 is a schematic diagram showing the use of the invention in conjunction with pipe line transportation of liquid; and FIG. 5 is a schematic diagram showing additional use of the invention in conjunction with pipe line transport of liquid.

A typical chromatographic unit as illustrated in FIG. 1 includes a chromatographic column 10 enclosing an adsorbent packing material 11. A carrier fluid is introduced to a mixing chamber 12 through a conduit 13 and a sample fluid to be analyzed is introduced to the mixing chamber 12 through a conduit 14. The sample fluid is dispersed in the carrier fluid and passes from the mixing chamber 12 through conduit 15 into the column 10 wherein the various constituents of interest in the sample are fractionated or subdivided in a manner known in the chromatographic art, and are sequentially discharged from the column through conduit 16 in the carrier fluid. The effluent from the column passes through a detector 17 wherein it is desired to sense the sequential appearance of different fractions of the sample feed.

The fixed-focus refractometer shown in FIG. 2 makes an ideal detector for use in a chromatographic system of the type described above.

Referring to FIGS. 2 and 3, the latter being an elevation taken on line 3—3 of FIG. 2, the refractometer unit there shown includes an optical cell 20, the cell itself consisting of two sections 21, 22 interconnected by a conduit 23 and with an inlet 24 into section 21 and an outlet 25 from section 22. The cell sections 21 and 22 are prismatic, optically transparent and are formed or disposed adjacent each other along the hypotenuse of the respective prismatic sections.

A light source 28 is focused through an aperture 29 in a shield 30 and through a collimating lens 31 on the cell 20 for light transmission through both sections of the cell. The light, after passing through an exterior wall 31A and an interior wall 31B of section 21, and an interior wall 31C and an exterior wall 31D of section 22, is focused by a lens 32 on an aperture 33 in a shield 34. A photocell 36 receives light passing through the aperture 33 and is connected in a circuit including an energizing battery 37 and an amplifier 38 to sensing means (not shown). The sensing means may be a conventional recorder, alarm or any other conventional unit for sensing variations in the electrical output of amplifier 38.

With fluids of uniform composition flowing through the cell 20 the light falling on photocell 36 is of constant intensity and the output of amplifier 38 is invariant. If at the cell section 21 there appears a front or interface formed by the appearance of a fluid of differing refractive index in the fluid stream fed into the cell, there will exist momentarily a difference in the refractive indices of the fluid volumes in the cell sections 21 and 22. This difference will, of course, refract the light beam passing through the two cells, will change the intensity of the light falling on the photocell 36, and will produce a variation in the output of the amplifier 38. As soon as this front has passed from the cell 21 through cell 22, equilibrium will be restored, the output of ampliler 38 will return to the same zero reading regardless of any change in the true refractive index of the liquid now in the cell. Thus, the preferred form of the apparatus is sensitive to momentary changes in refractive index due to the passing of an interface, but is insensitive to changes in refractive index of the liquid in the cell, such as might occur with ambient temperature variations. This occurs because the exterior walls and the interior walls of the cell sections are parallel. The same result can be obtained with non-parallel walls by using mirrors to reflect the light beam through an angle equivalent to that by which the walls deviate from parallelism. In either case, the exterior walls and the interior walls are respectively "optically parallel" as the term is used in this application.

FIGS. 2 and 3 show a system which may be used as a detector in a chromatographic unit of the type shown in FIG. 1. The same apparatus may be used as a front detector in pipe line transport of liquids. It is conventional in such transport to convey different liquids such as gasoline, diesel fuel, kerosene and the like through a single pipe line in discrete volumes separated from each other only by their own interface or by a so-called "slug" of a third liquid. Depending upon the similarity or dissimilarity of such liquids, the interface may be relatively sharp or may be comparatively diffuse, it making very little difference in either case since the cross-sectional area of the transport pipe is so infinitesimal in comparison to the length of the column of any of the liquids.

The invention is applicable to the detection of either a sharp or a diffuse interface in the manner shown in FIGS. 4 and 5, respectively. In FIG. 4, a pipe line 40 is shown as filled with a liquid A and a liquid B, separated in their pure state by a relatively well defined interface C. By connecting the cell 20 to the pipe line by means of conduits 42, 43 opening into the pipe line at points spaced greater than the dimension of the interface, a small amount of the fluid is carried through the conduit 42 through the cell and back into the pipe line through conduit 43. This fluid may be pumped through the by-pass or may be forced through the by-pass by a small pressure differential created by the normally existing lengthwise pressure drop in the line or by a constriction in the pipe intermediate the conduits 42, 43, as is conventional in sampling techniques. The optical system of FIG. 2 is not repeated in the drawing of FIG. 4, the cell 20 being assumed to form a part of such an optical system.

In the example as shown in FIG. 4, fluid A, at the instant depicted by the illustration, will be displacing fluid B from the first of the two portions of the cell 20, i.e., the interface mixture C will be passing through the cell. Referring back to FIG. 2, this displacement will produce a deflection of the light being focused through the cell with a consequent change in the intensity of the light falling on photocell 36 (see FIG. 2). This change signals the appearance of the front C which can thus be located as existing somewhere between the points of egress and inlet respectively of conduits 42, 43.

As shown in FIG. 5, the same system is applicable with equal reliabliity where the liquids A and B are separated by a large diffuse interface C, in this instance the conduits 42, 43 being connected separately to the two sides of the cell 20 in which conduit 23 has been plugged or removed. The effluent liquids are returned to the process line by a pump 44 as shown in the figure well downstream of where conduit 43 joins pipe line 40.

The use of a front detector of any of the described embodiments in liquid chromatography permits automatic collection of practically pure fractions, with each fraction of the sample being captive in separate respective containers rather than a collection of the separated samples in several dozen containers, with each container containing a fixed amount of effluent and separate measurement of the refractive index of each container required to establish which ones contain which fractions of the sample, as is now current practice. Clearly, volumetric measurements in such pure fractions afford a simple basis for quantitative analysis of mixtures.

I claim:

1. Appratus for detecting a composition change in a moving fluid stream comprising a conduit through which the fluid stream flows, an optically transparent cell, the cell including a first section and a second section, the first section having an exterior and an interior wall, the second section having an exterior wall and an interior wall, means for flowing at least a portion of the fluid stream serially from the conduit through the first and second sections, means for passing a beam of light through the exterior and interior walls of the first section and through the interior and exterior walls of the second section, the said exterior walls being substantially optically parallel, and the said interior walls being substantially optically parallel, the exterior walls and interior walls being optically non-parallel so that a sequential variation in refractive index of the fluid in the sections produces a deviation of the light beam, and means to sense deviation of the beam.

2. In combination with a pipe line for liquid transport, detector means for sensing a moving liquid interface in the pipe line comprising an optically transparent cell having two optically aligned sections, a first bleed line connected between the pipe line and one cell section to flow a part of the liquid stream through said one section, a second bleed line connected between the pipe line downstream of the first bleed line and the other cell section to flow a different part of the liquid stream through said other section, means for returning the liquid flowing through the cell sections to the pipe line downstream of the second bleed line, means for directing a light beam through the two cell sections whereby any change in refractive index of the liquid flowing through either section will result in a significant deviation of the transmitttd beam, and means operable to sense deviation of the beam to indicate that the liquid interface has reached one of said bleed lines.

3. Apparatus according to claim 2 wherein the first and second bleed lines are connected to the pipe line at points spaced greater than the extent of said liquid interface.

References Cited in the file of this patent

UNITED STATES PATENTS

| | | |
|---|---|---|
| 2,412,602 | Chambers et al. | Dec. 17, 1946 |
| 2,421,854 | Seaman | June 10, 1947 |
| 2,427,996 | Seaman | Sept. 23, 1947 |
| 2,445,044 | Stamm et al. | July 13, 1948 |
| 2,583,973 | Stamm et al. | Jan. 29, 1952 |
| 2,612,814 | Glasser | Oct. 7, 1952 |
| 2,690,695 | Coates | Oct. 5, 1954 |
| 2,762,254 | Kegeles | Sept. 11, 1956 |
| 2,859,757 | Parsons | Nov. 11, 1958 |
| 2,868,216 | Robertson | Jan. 13, 1959 |